United States Patent
Lee et al.

(10) Patent No.: US 11,360,206 B2
(45) Date of Patent: Jun. 14, 2022

(54) DETECTION DEVICE AND DETECTION METHOD THEREOF

(71) Applicant: NATIONAL CHIAO TUNG UNIVERSITY, Hsinchu (TW)

(72) Inventors: Ta-Sung Lee, Hsinchu (TW);
Kuan-Hen Lin, Kaohsiung (TW);
Yu-Chien Lin, New Taipei (TW);
Yun-Han Pan, Taipei (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 223 days.

(21) Appl. No.: 16/922,555

(22) Filed: Jul. 7, 2020

(65) Prior Publication Data
US 2021/0165090 A1    Jun. 3, 2021

(30) Foreign Application Priority Data
Nov. 29, 2019 (TW) ................... 108143554

(51) Int. Cl.
*G01S 13/34* (2006.01)
*G01S 13/58* (2006.01)

(52) U.S. Cl.
CPC ............ *G01S 13/584* (2013.01); *G01S 13/34* (2013.01)

(58) Field of Classification Search
CPC ...... G01S 13/34; G01S 13/584; G01S 13/931; G01S 7/411
See application file for complete search history.

(56) References Cited

U.S. PATENT DOCUMENTS

| 9,726,758 B2 | 8/2017 | Moon et al. |
| 2016/0245911 A1 | 8/2016 | Wang et al. |
| 2019/0178985 A1 * | 6/2019 | Roh ............... G01S 7/2923 |

FOREIGN PATENT DOCUMENTS

CN    103091673 A * 5/2013

OTHER PUBLICATIONS

Abbadi et al., "A New adaptive CFAR Processor in Multiple Target Situations", 7th Seminar on Detection Systems: Architectures and Technologies (DAT'2017), Feb. 20-22, 2017, Algiers, Algeria, total 5 pages.

(Continued)

*Primary Examiner* — Timothy A Brainard
(74) *Attorney, Agent, or Firm* — Birch, Stewart, Kolasch & Birch, LLP

(57) ABSTRACT

The present invention provides a detection device and a method with simplified computing manner A transmitter transmits detection signals to an environment to detect a target. At least a portion of the detection signals are reflected by the target to generate a plurality of reflection signals. A receiver comprises a plurality of receiving units. Each of the receiving units receives the reflection signals to generate a receiving signal. A processing module connected to the receiver includes a conversion unit, an integration unit and a computing unit. The conversion unit converts the receiving signals into transformation signals by a time-domain to frequency-domain transformation. The integration unit integrates the transformation signals into a first integration signal and a second integration signal. The computing unit decomposes the first integration signal and the second integration signal to 1D arrays. The location or the speed of the target is determined by limiting target sites through detection algorithms and a crossed-validation method.

24 Claims, 4 Drawing Sheets

(56) References Cited

OTHER PUBLICATIONS

Liu et al., "Research on a New Comprehensive CFAR (Comp-CFAR) Processing Method", IEEE, 2019, vol. 7, pp. 19401-19413.
Rohling, "Radar CFAR Thresholding in Clutter and Multiple Target Situations", IEEE Transactions on Aerospace and Electronic Systems, vol. AES-19, No. 4, Jul. 1983, pp. 608-621.
Xu et al., "An Improved CFAR Algorithm for Target Detection", 2017 International Symposium on Intelligent Signal Processing and Communication Systems, Nov. 6-9, 2017, Xiamen, China, pp. 883-888.

* cited by examiner

DETECTION DEVICE AND DETECTION METHOD THEREOF

BACKGROUND OF THE INVENTION

1. Field of the Invention

The present invention generally relates to a detection device and a detection method thereof, in particular, a detection device and detection method to simplify the complexity of computing process.

2. Description of the Prior Art

Time of flight (TOF) technologies and Doppler systems are used for measuring distance to a location and the relative speed of the target or motion status of the target. Detection signals, such as optical, acoustic or electromagnetic signals, transmitted by a transmitter are reflected by the target to generate reflection signals received by a receiver. The location of the target is calculated using the time difference between transmitting the detection signals and receiving the reflection signals, and the relative speed of the target is calculated using the frequency shift between the detection signals and the reflection signals.

Radar detection system is a detection system that transmits electromagnetic signals. In the early days, it was developed as a military system, but in recent years, it has been widely used in daily life, especially in vehicle driving aid systems. For example, both of the adaptive cruise control (ACC) system and the automatic emergency braking (AEB) system need to rely on radars to detect targets. The motion status of a target in front of the vehicle and the distance between the target and the vehicle can be known through the use of a radar. The vehicle control instructions are then computed by a computer or a processor and provided to the vehicle's control computer or the driver. Therefore, vehicle safety can be improved through vehicle driving aid systems.

However, during the driving process, since conditions on the road change rapidly, the radar detection system needs to deliver fast and sensitive responses to deal with various emergencies on the road. Besides, the radar system may detect a plurality of targets and noises generated from the ambient environment, which may influence the accuracy of the radar detection system. Accordingly, a radar detection system is required to analyze the motion state and relative location of the targets rapidly and correctly in a three-dimension space. Although using advanced computers or high performance processors will meet the requirements above, such implementation will increase the production cost and the maintenance fee of the radar detection system. Therefore, it is necessary to simplify the computing complexity of a radar detection system to reduce its hardware requirements.

SUMMARY OF THE INVENTION

The present invention provides a detection device and detection method to simplify the complexity of computing process. The computing efficiency of the detection device will be improved and the detection time will be reduced. The detection device is able to compute the distance from a target and the relative speed of the target or obstacle in a short time.

The present invention provides a detection device configured to detect a target. The detection device comprises a transmitter, a receiver and a processing module. The transmitter transmits a plurality of detection signals to an environment where the target is located. At least a portion of the detection signals are reflected by the target to generate a plurality of reflection signals. The receiver comprises a plurality of receiving units. Each of the receiving units receives the reflection signals to generate a receiving signal. The processing module is connected to the receiver. The processing module includes a conversion unit, an integration unit and a computing unit. The conversion unit is configured to convert the receiving signals into transformation signals by a time-domain to frequency-domain transformation. The integration unit is configured to integrate the transformation signals into a first integration signal and a second integration signal. The computing unit is configured to compute the first integration signal along a column direction to obtain a plurality of column thresholds and compute the first integration signal along a row direction to obtain a plurality of row thresholds. Wherein the computing unit decomposes the second integration signal into a plurality of second column signals along the column direction and a plurality of second row signals along the row direction. The computing unit selects at least one first site in each of the second column signals that is greater than the corresponding column threshold, and selects at least one second site in each of the second row signals that is greater than the corresponding row threshold. The computing unit performs a comparison between the first site selected and the second site selected to obtain an overlapping part and determine the speed or the location of the target based on the overlapping part.

The present invention provides a detection method for detecting a target. The detection method comprises transmitting a plurality of detection signals to an environment where the target is located; receiving, by a plurality of receiving units, a plurality of reflection signals reflected by the target in response to the detection signals wherein each receiving unit generates a receiving signal; converting the receiving signals into transformation signals by a time-domain to frequency-domain transformation; integrating the transformation signals into a first integration signal and a second integration signal; computing the first integration signal along the column direction to obtain a plurality of column thresholds and computing the first integration signal along the row direction to obtain a plurality of row thresholds; decomposing the second integration signal into a plurality of second column signals along the column direction and a plurality of second row signals along the row direction; selecting at least one first site in each of the second column signals that is greater than the corresponding column threshold and selecting at least one second site in each of the second row signals that is greater than the corresponding row threshold; performing a comparison between the first site selected and the second site selected to obtain an overlapping part and determining the speed or the location of the target based on the overlapping part.

Accordingly, the detection device and the detection method of the application integrates the receiving signals into a two-dimension signal and decomposes the two-dimensional signal to one-dimension signals along a column direction and a row direction. Preliminary results are obtained by the sites in the one-dimensional signals that are greater than the corresponding threshold. Continually, the real results with noises and artifacts eliminated are obtained by a cross-comparison of the sites that are larger than the corresponding threshold to reduce the complexity of computing process and improve the computing efficiency.

DETAILED DESCRIPTION OF THE PREFERRED EMBODIMENT

The connecting elements according to the present invention will be described in detail below through embodiments and with reference to the accompanying drawings. A person having ordinary skill in the art may understand the advantages and effects of the present disclosure through the contents disclosed in the present specification.

It should be understood that, even though the terms such as "first", "second", "third" may be used to describe an element, a part, a region, a layer and/or a portion in the present specification, but these elements, parts, regions, layers and/or portions are not limited by such terms. Such terms are merely used to differentiate an element, a part, a region, a layer and/or a portion from another element, part, region, layer and/or portion. Therefore, in the following discussions, a first element, portion, region, layer or portion may be called a second element, portion, region, layer or portion, and do not depart from the teaching of the present disclosure.

The terms "including", "comprising", "having", "containing" and the like used in this article are all open-ended terms, which means including but not limited to.

Regarding the terms used in this article, unless otherwise specified, each term usually means its ordinary meaning in this field, in the content disclosed here, and in a special content. Certain terms used to describe this disclosure are discussed below or elsewhere in this specification to provide additional guidance to those skilled in the art on the description of this disclosure.

Figure 1:
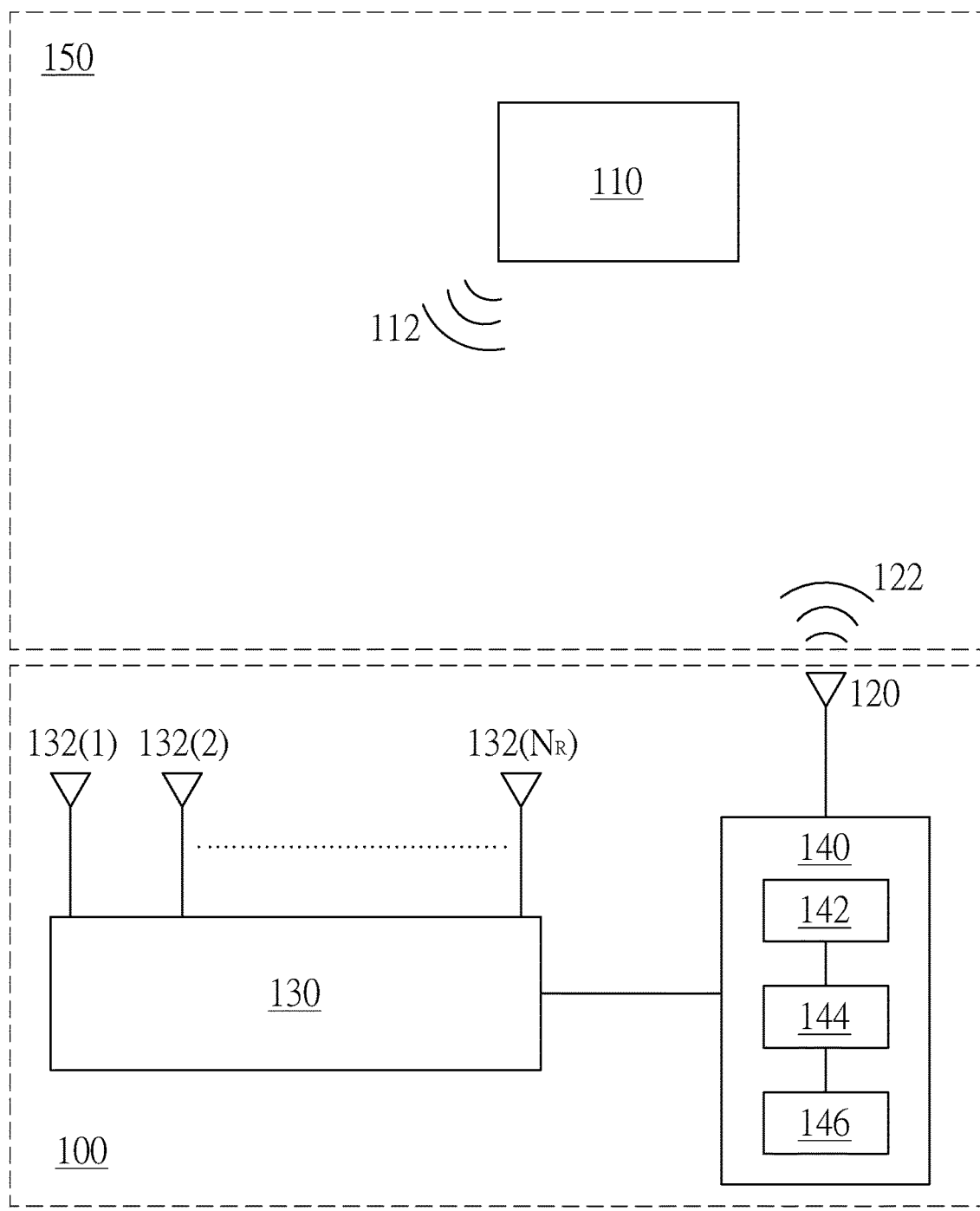
FIG. 1 is an architecture diagram according to an embodiment.

FIG. 1 is an architecture diagram according to an embodiment of the present invention. Referring to FIG. 1, the detection device 100 is configured to detect target 110. The detection device 100 comprises the transmitter 120, the receiver 130 and the processing module 140. The target 110 can be a fixed or moving object, such as an obstacle or vehicle. The target 110 is located in the environment 150. The transmitter 120 sequentially transmits the detection signals 122 to the environment 150. The detection signals 122 are reflected by the target 110 to generate the reflection signals 112. For example. The transmitter 120 can be a transmitter used in TOF technologies, such as a laser transmitter, ultrasonic transmitter or electromagnetic transmitter. The transmitter 120 sequentially transmits the detection signals 122, for example, M number of detection signals 122, wherein M is any positive integer greater than 1. It should be noted that the transmitting frequency of each of the detection signals 122 can be the same, increasing or decreasing, and the amplitude of each of the detection signals 122 can be the same, increasing or decreasing. For example, the detection signals 122 can be frequency modulation continuous waves (FMCW). The M number of detection signals 122 are reflected by the target 110 to generate corresponding M number of reflection signals 112. However, the present invention is not limited to any number of the transmitter 120. The number of the transmitter 120 can be one or multiple. The receiver 130 comprises a plurality of receiving units, such as receiving units $132(1)$-$132(N_R)$, wherein $N_R$ is a positive integer greater than 1. Each of the receiving units $132(1)$-$132(N_R)$ receives the reflection signals 112 to generate receiving signals. The type of the receiver 130 corresponds to the reflection signals 112 reflected by the target 110. For example, if the type of the reflection signals 112 is an optical signal, then the receiving units $132(1)$-$132(N_R)$ can be optical receiving units, such as photosensitive coupling components. If the type of the reflection signals 112 is an electromagnetic signal, the receiving units $132(1)$-$132(N_R)$ can be electromagnetic receivers, such as an antenna. However, the present invention is not limited to the type of the receiver 130 or the receiving units $132(1)$-$132(N_R)$. The arrangement of the receiving units $132(1)$-$132(N_R)$ can be but not limit to linear array or phase array. The receiver 130 sequentially receives each of the M number of reflection signals 112. Each of the receiving units $132(1)$-$132(N_R)$ receives and samples each of the reflection signals 112 to generate N number of receiving values, wherein N is the product of the sampling rate and the sampling time of the receiver 130. Therefore, each of the receiving units $132(1)$-$132(N_R)$ generates a receiving signal. More specifically, each of the receiving signals is a two-dimensional matrix with size N×M. The number of the receiving signals is $N_R$.

The processing module 140 is connected to the receiver 130. The processing module 140 includes the conversion unit 142, the integration unit 144 and the computing unit 146. The processing module 140 can be components having computing functions, such as CPUs or microprocessors. The conversion unit 142, the integration unit 144 and the computing unit 146 can be realized by integrating or dividing the computing resource of the processing module 140, such as distributing or dividing the computing resource of the CPU, or by physical components, such as single-chip microprocessor, but not limited thereto. In an embodiment, the processing module 140 is connected to both the receiver 130 and the transmitter 120. The processing module 140 controls the transmitter 120 to transmit the detection signals 122 and computes the variation of time, frequency or phase between the detection signals 122 and the reflection signals 112 received by the receiver 130.

After the processing module 140 received $N_R$ number of receiving signals from the receiver 130, the conversion unit 142 converts each of the receiving signals into $N_R$ number of transformation signals by a time-domain to frequency-domain transformation. For example, the conversion unit 142 converts the receiving signals from time-domain to frequency-domain by Fourier transform, more specifically, by two-dimensional fast Fourier transform (2D FFT), to obtain transformation signals. The transformation signals can describe the distance or relative speed between the target 110 and the detection device 100. More specifically, TOF technologies compute the distance to the target based on the flight time and the transfer speed between the detection signals 122 and the reflection signals 112. When the relative speed between the target 110 and the detecting device 100 is not zero, according to Doppler effect, the frequency of the refection signals 112 received by the receiver 130 will differ from the frequency of the detection signals 122. The transformation signals are preferably two-dimensional signals, with one dimension of the transformation signals representing frequency or speed and the other dimension of the transformation signal representing distance or time, like a Range-Doppler map (RD map).

The integration unit 144 is configured to integrate the transformation signals into the first integration signal and the second integration signal. More specifically, the integration unit 144 integrates the transformation signals into the first integration signal by non-coherent integration. Non-coherent integration is an integration method that does not need to consider the phase or angle of the data. An example would be the averaging of transformation signals. Preferably, averaging the transformation signals $RDM_{NC}(n,m)$ as shown by the formula below, wherein $2DFFT(H_i)(n,m)$ represents the transformation signals, $N_R$ represents the number of receiving units. For a detection device with multiple antennas, non-coherent integration of transformation signals can be a basis for noise evaluation of the transformation signals. Since non-coherent integration averages the transformation signals corresponding to each of the receiving unit, one can sample the noises steadily.

$$RDM_{NC}(n, m) = \frac{1}{N_R} \sum_{i=0}^{N_R-1} |2DFFT(H_i)(n, m)|^2.$$

The integration unit integrates the transformation signals into the second integration signal by coherent integration. Coherent integration is an integration method that integrates according to similar properties, such as angular or phase. Coherent integration can enhance the energy received which is reflected by the target. Preferably, coherent integration is a spatial filtering of the transformation signals, represented by the formula $SFM_S(n,m)$ shown below. For example, using wave beams with S number of directions to perform spatial filtering to the transformation signals, wherein $\theta_S$ represents the Sth direction of the wave beams With the spatial filtering technology, the energy of the refection signal reflected by the target can obtain a gain of 10 $\log(N_R)$ dB.

$$SFM_s(n, m) = \sum_{i=0}^{N_R-1} 2DFFT(H_i)(n, m)e^{jni\frac{f_0+(n-1)\Delta f}{f_c}\sin\theta_s}, s = 1, \ldots, S.$$

Figure 2:
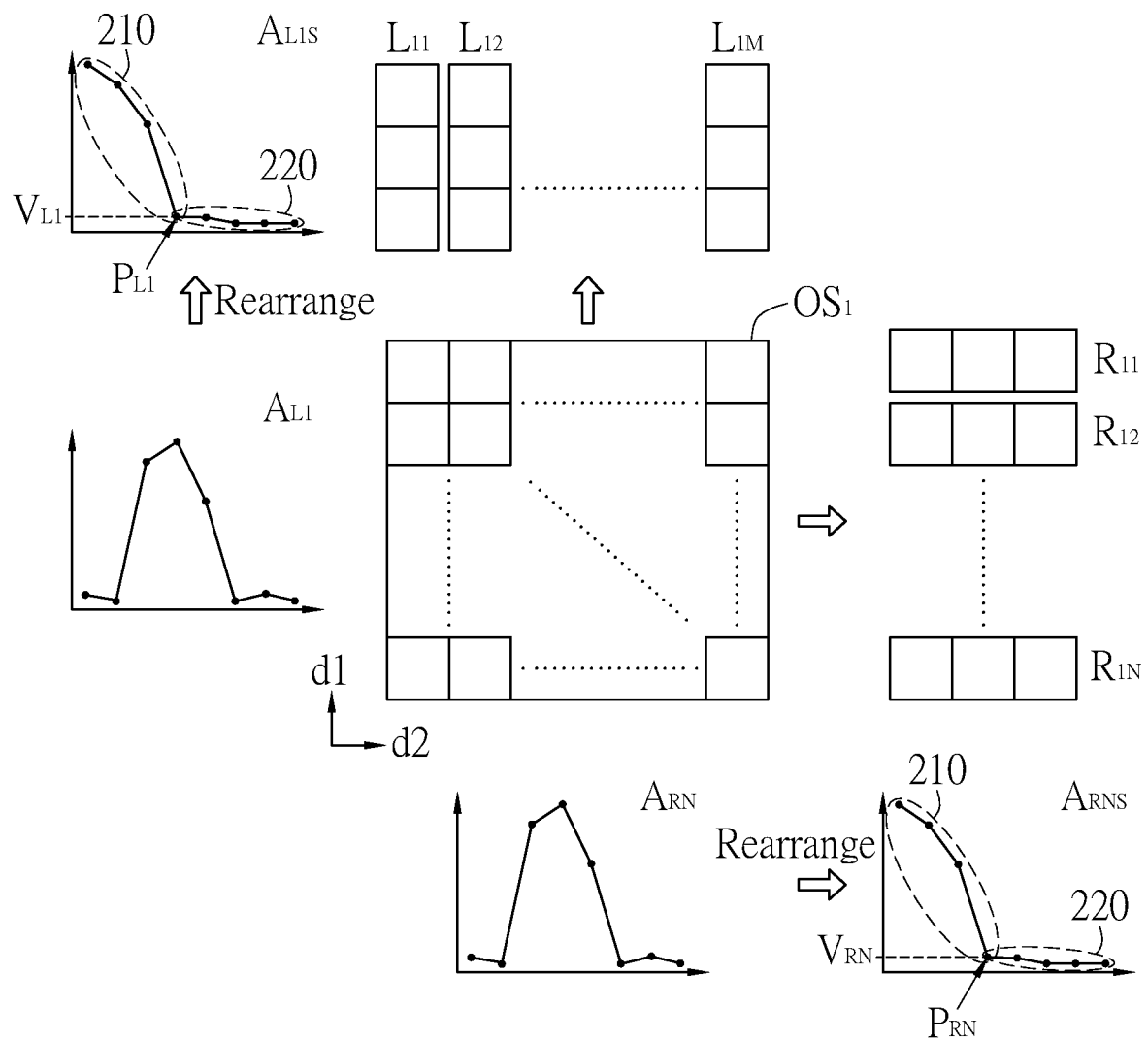
FIG. 2 is a schematic diagram of decomposing the first integration signal according to an embodiment.

The computing unit is configured to compute a plurality of column thresholds along the column direction and a plurality of row thresholds along the row direction. More specifically, referring to FIG. 2, the first integration signal $OS_1$ is decomposed into M number of first column signals $L_{11}$-$L_{1M}$ along the column direction d1. The data of each of the first column signals $L_{11}$-$L_{1M}$ will be rearranged by their values to form new sequences. The column threshold corresponding to each of the first column signals $L_{11}$-$L_{1M}$ is the elbow point of the corresponding sequence. For example, the original sequence of the first column signal $L_{11}$ is represented as sequence Au, the new sequence which is rearranged by their values is represented as new sequence $A_{L1S}$. The column elbow point $P_{L1}$ of the new sequence $A_{L1S}$ is the column threshold $V_{L1}$ of the first column signal $L_{11}$. Similarly, the first integration signal $OS_2$ is decomposed into N number of first row signals $R_{11}$-$R_{1N}$ along the row direction d2. The data of each of the first row signals $R_{11}$-$R_{1N}$ will be rearranged by their values to form new sequences. The row threshold $V_{RN}$ corresponding to each of the row column signals $R_{11}$-$R_{1N}$ is the elbow point of the corresponding sequence. For example, the original sequence of the first row signal $R_{1N}$ is represented as sequence $A_{RN}$; the new sequence which is rearranged by the values is represented as the new sequence $A_{RNS}$. The row elbow point PRN of the new sequence $A_{RNS}$ is the row threshold of the first row signal $R_{1N}$. Therefore, M number of column thresholds corresponding to M number of first column signals are generated, and N number of row thresholds corresponding to N number of first row signals are generated. In an embodiment, the composition of a new sequence, e.g. new sequence $A_{L1S}$, $A_{RNS}$, includes two parts. The first part is the steep sequence 210 and the second part is the flat sequence 220. The steep sequence 210 contains energy of the reflection signals 112 reflected by the target 110. The flat sequence 220 represents the energy of noise. The boundary between the first part and the second part is defined as the column elbow point or row elbow point.

Figure 3:
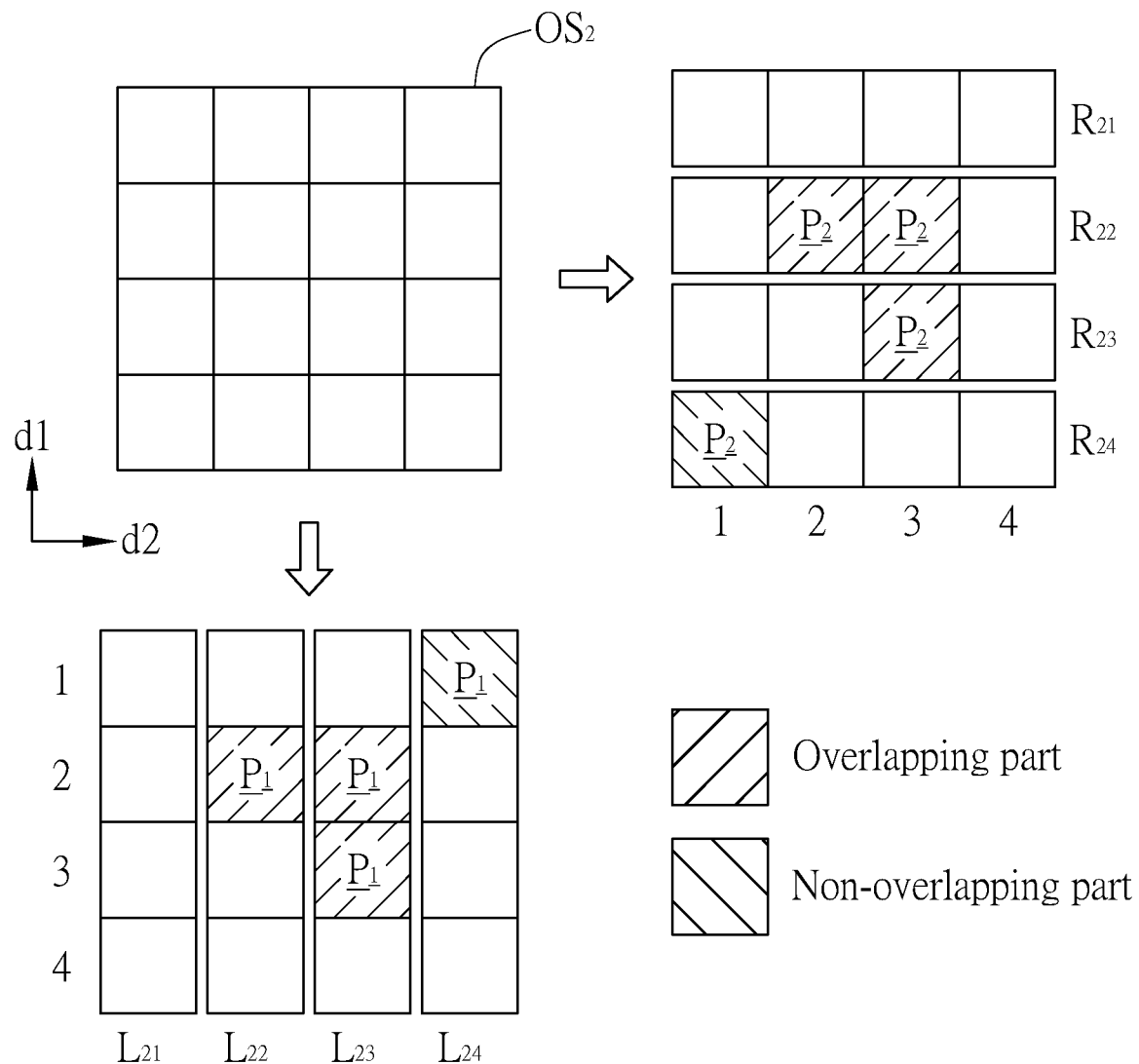
FIG. 3 is a schematic diagram of decomposing and computing the second integration signal according to an embodiment.

FIG. 3 is a schematic diagram of decomposing and computing the second integration signal in an embodiment. Refer to FIG. 3. The computing unit 146 decomposes the second integration signal $OS_2$ into a plurality of second column signals $L_{21}$-$L_{24}$ along the column direction d1 and decomposes the second integration signal $OS_2$ into a plurality of second row signals $R_{21}$-$R_{24}$ along the row direction d2. The computing unit 146 selects at least one first site $P_1$ where each of the second column signals $L_{21}$-$L_{24}$ is greater than the corresponding column threshold $V_{L1}$-$V_{L4}$. It should be noted that each of the second column signals $L_{21}$-$L_{24}$ may have one or more first sites $P_1$ or may not have a first site $P_1$. The computing unit 146 selects at least one second site $P_2$ where each of the second row signals $R_{21}$-$R_{24}$ is greater than the corresponding row threshold $V_{R1}$-$V_{R4}$. It should be noted that each of the second row signals $R_{21}$-$R_{24}$ may have one or more second sites $P_2$ or may not have a second sites $P_2$. In addition, FIG. 3 is a simplified illustration which illustrates using only a 4×4 matrix. The size of the second integration signal $OS_2$ is not limited by the illustration of FIG. 3 and the size of the second integration signal $OS_2$ is equal to the size of the first integration signal $OS_1$.

The computing unit compares at least one first site $P_1$ with at least one second site $P_2$ to obtain an overlapping part, and further determines the speed or location of the target based on the overlapping part. More specifically, for example, the first site $P_1$ located at the second position of the second column signal $L_{22}$ has the coordinate (2,2) in the second integration signals $OS_2$. Also having the coordinate (2,2) in the second integration signals $OS_2$ is the second site $P_2$ located at the second position of the second row signal $R_{22}$. An example of a non-overlapping part is the first site $P_1$ located at the first position of the second column signal $L_{24}$, having the coordinate (1,4) in the second integration signals $OS_2$. However, the coordinate (1,4) of the second integration signals $OS_2$ does not have a second site $P_2$ located at the fourth position of the second row signal $R_{21}$. Therefore, the coordinate (1,4) of the second integration signals $OS_2$ is an example of a non-overlapping part. Based on the overlapping part of the first site $P_1$ and the second site $P_2$ in the second integration signal $OS_2$, artifacts or misjudgments caused by noises, i.e. the non-overlapping parts, can be removed. In an embodiment of the present invention, comparison method to obtain the overlapping part of the first site $P_1$ and the second site $P_2$ in the second integration signal $OS_2$ can be a 2D ordered statistics constant false alarm rate (OS-CFAR) to eliminate the artifacts or the misjudgments caused by noises. After the overlapping part is obtained, the relative speed and the distance to the target can be derived based on the overlapping part and the corresponding transformation signal. More specifically, the overlapping part in the corresponding transformation signal represents the real signals with the noises eliminated. In other words, the overlapping part in the corresponding transformation signal represents the part with higher signal strength. The two dimensions of the transformation signal can respectively represent the speed and distance. The relative speed and the distance between the target 110 and the detection device 100 can be computed based on the part with higher signal strength of the transformation signal.

Figure 4:
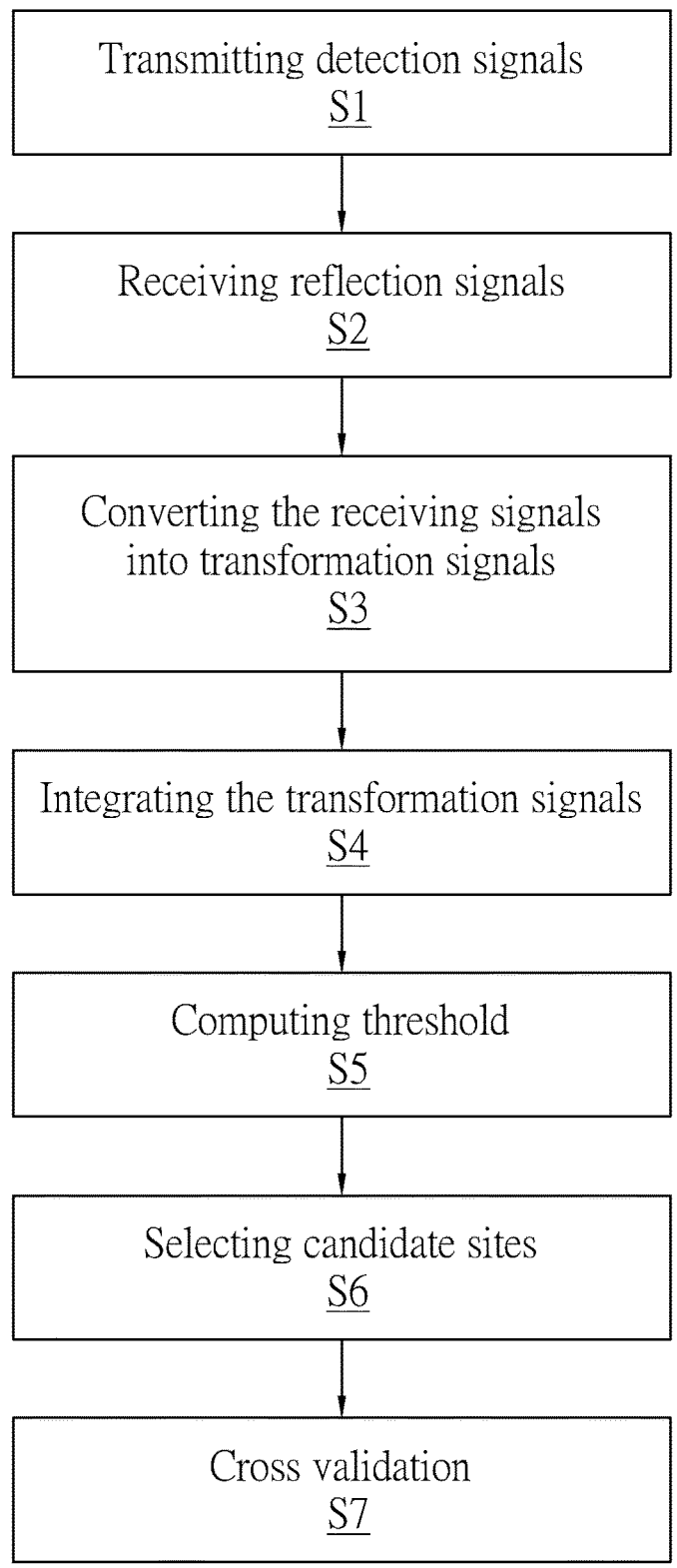
FIG. 4 is a flow chart of the detection method according to an embodiment.

The present invention provides a detection method. The detection method is configured to detect a target. FIG. 4 is a flow chart of the detection method in an embodiment. Refer to FIG. 4, the detection method comprises steps below. Step S1 is transmitting a plurality of detection signals to an environment where the target is located. Step S2 is receiving, by a plurality of receiving units, a plurality of reflection signals reflected by the target in response to the detection signals wherein each receiving unit generates a receiving signal. It should be noted that each of the detection signals is reflected by the target to generate a corresponding reflection signal. Each of the receiving units sequentially receives the reflection signals to generate a receiving signal; Step S3 is converting the receiving signals into transformation signals by a time-domain to frequency-domain transformation. More specifically, the time-domain to frequency-domain transformation is 2D fast Fourier transformation. Step S4 is integrating the transformation signals into a first integration signal and a second integration signal. The integration methods include a non-coherent integration and a coherent integration. The first integration signal is derived by the non-coherent integration and the second integration signal is derived by the coherent integration, but not limited thereto. Step S5 is computing threshold. More specifically, a plurality of column thresholds are computed using the first integration signal along the column direction, and a plurality of row thresholds are computed using the first integration signal along the row direction. Preferably, the first integration signal is decomposed into first column signals along the column direction and first row signals along the row direction. After rearranging the data of each of the first column signals by their value to form a new sequence, the column elbow point of the new sequence is defined as the column threshold of the first column signal. Additionally, after rearranging the data of each of the first row signals by their value to form a new sequence, the row elbow point of the new sequence is defined as the row threshold of the first row signal. Step S6 is selecting candidate sites. More specifically, the second integration signal is decomposed into a plurality of second column signals along the column direction and a plurality of second row signals along the row direction. At least one first site is selected from each of the second column signals which is greater than the corresponding column threshold. At least one second site is selected from each of the second row signals which is greater than the corresponding row threshold. Step S7 is cross validation. More specifically, an overlapping part is obtained through a comparison between the first site selected and the second site selected. The speed or the location of the target is determined based on the overlapping part.

Although the present invention discloses the aforementioned embodiments, the aforementioned embodiments are not intended to limit the invention. Any person who is skilled in the art in connection with the present invention can make any change or modification without departing from the spirit and the scope of the present invention. Therefore, the scope of protection of the present invention should be determined by the claims in the application.

What is claimed is:

1. A detecting device configured to detect a target, comprising:
   a transmitter transmitting a plurality of detection signals to an environment where the target is located, at least a portion of the detection signals reflected by the target to generate a plurality of reflection signals;
   a receiver comprising a plurality of receiving units, each of the receiving units receiving the reflection signals to generate a receiving signal; and
   a processing module connected to the receiver, the processing module including:
      a conversion unit configured to convert the receiving signals into transformation signals by a time-domain to frequency-domain transformation;
      an integration unit configured to integrate the transformation signals into a first integration signal and a second integration signal; and
      a computing unit configured to compute the first integration signal along a column direction to obtain a plurality of column thresholds and compute the first integration signal along a row direction to obtain a plurality of row thresholds,
      wherein the computing unit decomposes the second integration signal into a plurality of second column signals along the column direction and decomposes the second integration signal into a plurality of second row signals along the row direction;
      the computing unit selects at least one first site in each of the second column signals that is greater than the corresponding column threshold and selects at least one second site in each of the second row signals that is greater than the corresponding row threshold;
      the computing unit performs a comparison between the at least one first site and the at least one second site to obtain an overlapping part and determine a speed or a location of the target based on the overlapping part.

2. The detecting device of claim 1, wherein the transmitting frequency of the detection signals is increasing or decreasing.

3. The detecting device of claim 1, wherein the time-domain to frequency-domain transformation is 2D fast Fourier transformation.

4. The detecting device of claim 1, wherein the transformation signal is a 2D signal; one dimension of the transformation signal represented as frequency or speed and the other dimension of the transformation signal represented as distance or time.

5. The detecting device of claim 1, wherein the first integration signal is derived by a non-coherent integration, and the second integration signal is derived by a coherent integration.

6. The detecting device of claim 5, wherein the non-coherent integration is averaging the transformation signals.

7. The detecting device as claimed in claim 5, wherein the coherent integration is a spatial filtering of the transformation signals.

8. The detecting device of claim 1, wherein the amount of the column thresholds is equal to the number of columns of the first integration signal, and the amount of the row thresholds is equal to the number of rows of the second integration signal.

9. The detecting device of claim 1, wherein the computing unit decomposes the first integration signal into a plurality of first column signals along the column direction and a plurality of first row signals along the row direction; each of the first column thresholds is generated based on a corresponding one of the column signals; each of the first row thresholds is generated based on a corresponding one of the row signals.

10. The detecting device of claim 9, wherein the sequence of each of the first column signals has a column elbow point corresponding to the column threshold, and the sequence of each of the first row signals has a row elbow point corresponding to the row threshold.

11. The detecting device of claim 1, wherein the column signals and the row signals are 1D signals.

12. The detecting device of claim 1, wherein the method of the comparison is a 2D ordered statistics constant false alarm rate (OS-CFAR).

13. A detecting method for detecting a target, comprising:
transmitting a plurality of detection signals to an environment where the target is located;
receiving, by a plurality of receiving units, a plurality of reflection signals reflected in response to the Detection signals by the target to each generate a receiving signal;
converting the receiving signals into transformation signals by a time-domain to frequency-domain transformation;
integrating the transformation signals into a first integration signal and a second integration signal;
computing the first integration signal along the column direction to obtain a plurality of column thresholds and computing the first integration signal along the row direction to obtain a plurality of row thresholds;
decomposing the second integration signal into a plurality of second column signals along the column direction and decomposing the second integration signal into a plurality of second row signals along the row direction;
selecting at least one first site in each of the second column signals that is greater than the corresponding column threshold and selecting at least one second site in each of the second row signals that is greater than the corresponding row threshold;
performing a comparison between the at least one first site and the at least one second site to obtain an overlapping part and determining a speed or a location of the target based on the overlapping part.

14. The detecting method of claim 13, the transmitting frequency of the detection signals is increasing or decreasing.

15. The detecting method of claim 13, wherein the time-domain to frequency-domain transformation is 2D fast Fourier transformation.

16. The detecting method of claim 13, wherein the transformation signal is a 2D signal; one dimension of the transformation signal represented as frequency or speed and the other dimension of the transformation signal represented as distance or time.

17. The detecting method of claim 13, wherein the first integration signal is derived by a non-coherent integration, and the second integration signal is derived by a coherent integration.

18. The detecting method of claim 17, wherein the non-coherent integration is averaging the transformation signals.

19. The detecting method of claim 17, wherein the coherent integration is a spatial filtering of the transformation signals.

20. The detecting method of claim 17, wherein the amount of the column thresholds is equal to the number of columns of the first integration signal, and the amount of the row thresholds is equal to the number of rows of the second integration signal.

21. The detecting method of claim 13, further comprising:
decomposing the first integration signal into a plurality of first column signals along the column direction and a plurality of first row signals along the row direction; each of the first column thresholds is generated based on a corresponding one of the column signals; each of the first row thresholds is generated based on a corresponding one of the row signals.

22. The detecting method of claim 21, wherein the sequence in each of the first column signals has a column elbow point corresponding to the column threshold, and the sequence in each of the first row signals has a row elbow point corresponding to the row threshold.

23. The detecting method of claim 13, wherein the column signals and the row signals are 1D signals.

24. The detecting method of claim 13, wherein the method of the comparison is a 2D ordered statistics constant false alarm rate.

* * * * *